UNITED STATES PATENT OFFICE.

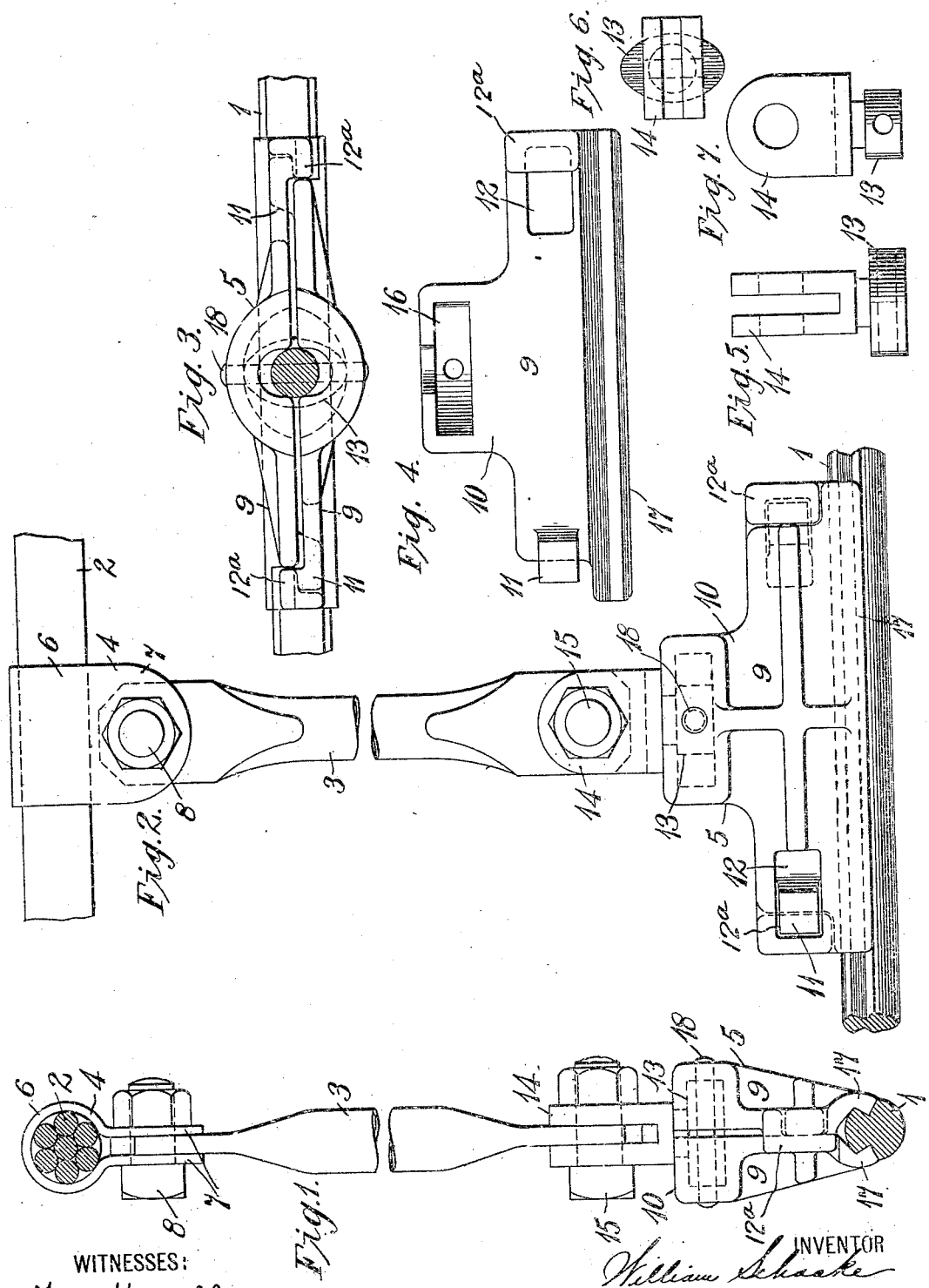

WILLIAM SCHAAKE, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TROLLEY-CONDUCTOR CLAMP.

958,833.     Specification of Letters Patent.     Patented May 24, 1910.

Application filed November 19, 1908. Serial No. 463,485.

*To all whom it may concern:*

Be it known that I, WILLIAM SCHAAKE, a citizen of the United States, and a resident of Pittsburg, in the county of Allegheny and State of Pennsylvania, have invented a new and useful Improvement in Trolley-Conductor Clamps, of which the following is a specification.

My invention relates to trolley-conductor clamps and it has for its object to provide a simple and durable device of this character that shall comprise relatively few parts which may be easily formed of cast material.

My invention is illustrated in the accompanying drawings in which—

Figures 1 and 2 are, respectively, an end and a front elevation of a trolley-conductor hanger provided with my improved clamp and Figs. 3, 4, 5, 6 and 7 are detail views of the clamp shown in Figs. 1 and 2.

Referring to the drawings, the trolley conductor 1 is suspended from a messenger wire or cable 2 by means of a hanger rod 3, a cable clamp 4 and a trolley-conductor clamp 5. The cable clamp 4 comprises a loop 6 which surrounds the cable 2 and is provided with a pair of ears 7, the upper end of the connecting rod 3 being flattened to fit between the ears 7 and being secured in position by means of a bolt 8.

The trolley-conductor clamp 5 comprises a pair of interchangeable members 9 each of which has a shank projection 10 at one edge, a laterally projecting hook lug 11 at one end, a recess or hole 12 and a flange 12ᵃ at its other end and a jaw 17 at the edge which is opposite the shank 10. The shank projections 10 are provided with internal complementary recesses 16 to receive a cam 13 which is substantially elliptical in form and is provided with a bifurcated projection 14 by which it is secured to the lower end of the hanger rod 3, a bolt 15 being located in alined holes in the bifurcated projection and the hanger rod to serve as a hinge pin. The hook lug 11 of each member 9 projects into the recess 12 in the other member and engages its flange 12ᵃ, the interlocked hook lugs and flanges serving to form a fulcrum for the said members. The cam 13 fits loosely in the recesses 16 when the plane of the projection 14 is perpendicular to the trolley wire but when it is turned through an angle of substantially 90 degrees it forces the shank projections away from each other and effects a clamping action between the jaws 17 of the members 9. The jaws 17 may be of any suitable length and are adapted to conform to the shape of the trolley conductor 1 which may be either circular in cross section or grooved in a well known manner. After the cam 13 is turned to its operative position, a pin or rivet 18 may be inserted into alined holes in the walls of the shank projections 10 and the cam in order to lock the parts in operative relation.

Attention is called to the fact that practically no machine work is required on any of the clamp parts and that they may be cast of malleable iron or other suitable material and galvanized, in order to protect them from the weather, before they are assembled.

Since structural modifications may be effected within the spirit and scope of my invention, I desire that only such limitations shall be imposed as are indicated in the appended claims.

I claim as my invention:

1. A clamp comprising a pair of duplicate members having oppositely projecting shanks and jaws and intermediate interlocking fulcrum parts, in combination with means located between said shanks to exert a separating force whereby the jaws are moved toward each other.

2. A clamp comprising a pair of duplicate members having oppositely projecting shanks and jaws and intermediate interlocking fulcrum projections, in combination with a rotatably adjustable cam located between the shanks for forcing them away from each other and the jaws toward each other.

3. A clamp comprising a pair of interchangeable duplicate members having jaws and internally recessed shanks and intermediate interlocking hook lugs and flanges, in combination with a cam member located in the shank recesses and rotatably adjustable to force the shanks apart and the jaws together.

4. A clamp comprising a pair of interchangeable members having shank projections and jaws at their opposite edges and interlocking hook lugs and flanges intermediate their edges, said shank projections being provided with internal complementary recesses, in combination with an elliptical cam located in said complementary recesses and adapted to force the shank projections apart and the jaws together, when turned through an angle of substantially 90 degrees.

5. A trolley-conductor clamp comprising two duplicate members having jaws at one edge, internally recessed shanks at the opposite edge and intermediate hinge connections, in combination with a cam located between said shanks and rotatably adjustable to force the jaws into engagement with a trolley conductor, and means for locking the cam in its adjusted position.

In testimony whereof, I have hereunto subscribed my name this 10th day of November, 1908.

WILLIAM SCHAAKE.

Witnesses:
  L. M. ASPINNALL,
  BIRNEY HINES.